US007869765B2

(12) United States Patent
Liu et al.

(10) Patent No.: US 7,869,765 B2
(45) Date of Patent: Jan. 11, 2011

(54) DEVICE WITH BROADCAST RECEIVER AND LOCAL WIRELESS INTERFACE

(75) Inventors: Charles Liu, Chapel Hill, NC (US); Ivan Nelson Wakefield, Cary, NC (US); Geert Hendrik Weinans, Klijndijk (NL); Ambrosius Gerardus Maria Pohlmann, Zelhem (NL); Theodorus Johannes Boersma, Emmen (NL); Barteld Trip, Emmen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 487 days.

(21) Appl. No.: 11/872,432

(22) Filed: Oct. 15, 2007

(65) Prior Publication Data

US 2009/0100481 A1 Apr. 16, 2009

(51) Int. Cl.
*H04B 7/00* (2006.01)
*H04W 4/00* (2009.01)

(52) U.S. Cl. .................. 455/41.3; 455/41.2; 455/432.1

(58) Field of Classification Search ................ 455/3.01, 455/3.02, 41.2, 41.3, 569.2, 575.9, 96, 99, 455/152.1, 98, 41.1, 422.1, 432.1, 456.1
See application file for complete search history.

(56) References Cited

U.S. PATENT DOCUMENTS

| | | | |
|---|---|---|---|
| 7,072,686 | B1 | 7/2006 | Schrager |
| 2006/0180649 | A1 | 8/2006 | Casey |
| 2006/0294550 | A1 | 12/2006 | Matsuo |

OTHER PUBLICATIONS

International Search Report, corresponding to International Patent Application No. PCT/US2008/063662, dated Mar. 23, 2009.
Written Opinion, corresponding to International Patent Application No. PCT/US2008/063662, dated Mar. 23, 2009.
Patent Cooperation Treaty, International Preliminary Report on Patentability, Jan. 14, 2010, 6 pgs.

*Primary Examiner*—Eugene Yun
(74) *Attorney, Agent, or Firm*—R. Brian Drozd; Moore & Van Allen PLLC

(57) ABSTRACT

A device that includes a broadcast receiver and a local wireless interface where the broadcast receiver is capable of receiving broadcast data, and the local wireless interface is capable of communicating with at least one wireless device and transmitting at least some of the broadcast data to the at least one wireless device. The broadcast receiver may be an audio receiver, a video signal receiver, or a satellite receiver. The local wireless interface may be a Bluetooth interface, an IEEE 802.11 (WiFi) interface, an IrDA interface, or a home radio frequency (HomeRF) interface.

25 Claims, 5 Drawing Sheets

DEVICE WITH BROADCAST RECEIVER AND LOCAL WIRELESS INTERFACE

BACKGROUND OF THE INVENTION

The present invention is related to devices with a broadcast receiver, and more specifically to devices with a broadcast receiver and a local wireless interface.

Broadcast receivers that receive information broadcasted wirelessly over the air are used in many devices. For example, a common FM radio broadcast receiver receives radio signals from a radio broadcasting system allowing one to listen to music and other information being broadcasted. Further, currently some devices include a local wireless interface, for example, Bluetooth, that allows the device to wirelessly transfer information to another device capable of receiving information from a Bluetooth type of local wireless interface. For example, earpieces associated with mobile phones may have Bluetooth capabilities that allow wireless communication with the mobile phone. However, currently there are no devices or other methods that combine a broadcast receiver with a local wireless interface.

BRIEF SUMMARY OF THE INVENTION

Embodiments of the present invention are related to a device that includes a broadcast receiver, the broadcast receiver being capable of receiving broadcast data, and a local wireless interface, the local wireless interface being capable of communicating with at least one wireless device and transmitting at least some of the broadcast data to the at least one wireless device.

Embodiments of the present invention are further related to a method for transferring broadcast data that includes receiving broadcast data by a broadcast receiver at a device, and transmitting at least some of the broadcast data to at least one wireless device over a local wireless interface of the device.

Embodiments of the present invention are still further related to an apparatus comprising a storage medium with instructions stored therein, the instructions when executed causing a processing device to perform receiving broadcast data by a broadcast receiver at a device, and transmitting at least some of the broadcast data to at least one wireless device over a local wireless interface of the device.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
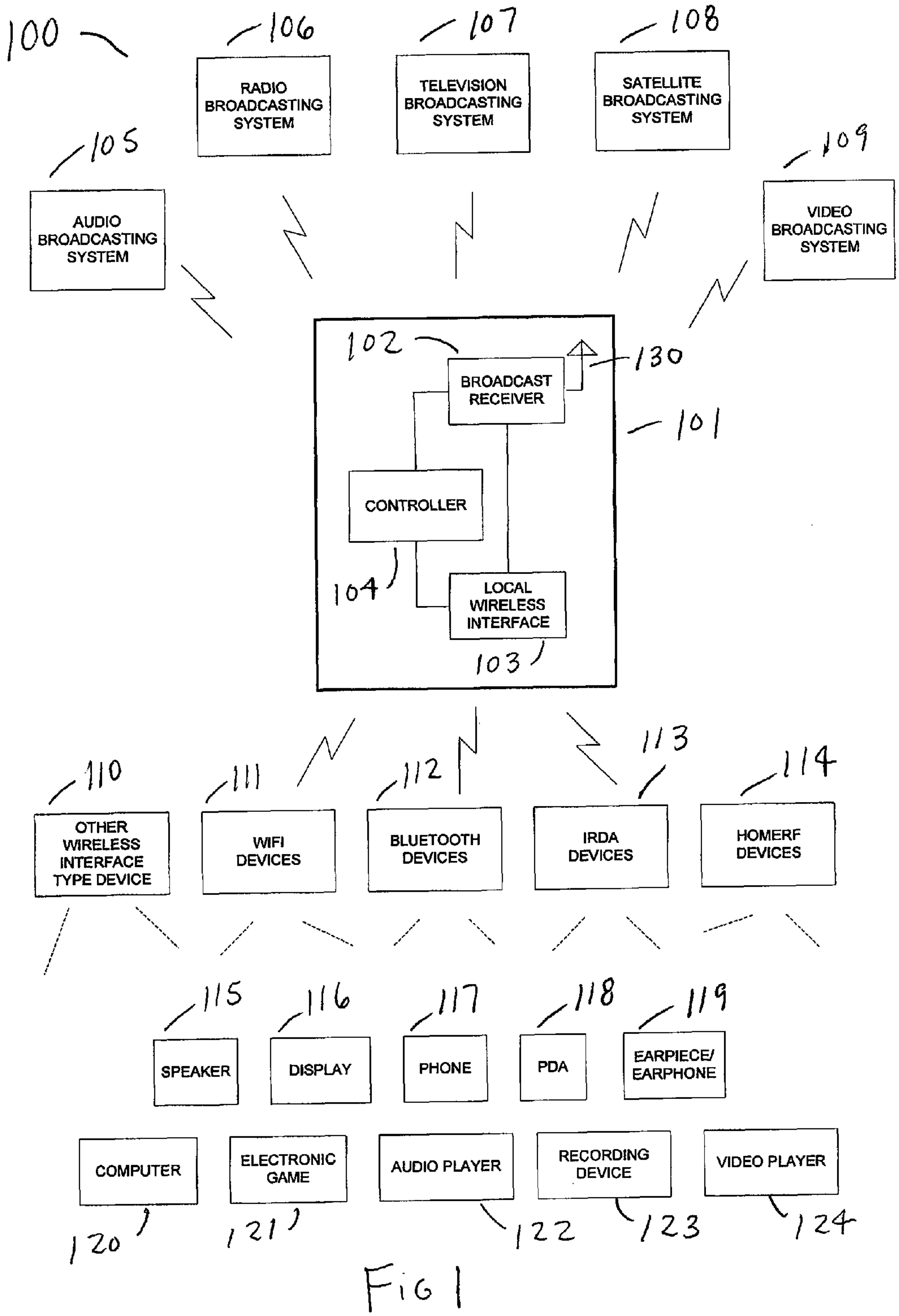
FIG. 1 is a diagram of a system including a device with broadcast receiver and local wireless interface according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages. Further, the computer program code for carrying out operations of the present invention may also be written in functional programming languages or any other type of programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention combine a broadcast receiver with a local wireless interface. This allows many new uses and applications. Further, the combination of a broadcast receiver with a local wireless interface is easy to use, and allows easy implementation of streaming of broadcast data from a broadcasting source to a device over a local wireless interface such as, for example, Bluetooth. Embodiments of the present invention may include devices containing a broadcast receiver and a local wireless interface contained in a single integrated circuit (IC) chip, devices containing a broadcast receiver integrated in one IC chip and a local wireless interface integrated into another IC chip, devices with a broadcast receiver and a local wireless interface implemented in discrete logic, devices where one or both the broadcast receiver and local wireless interface are implemented in software, or devices containing any combination of the above.

FIG. 1 shows a diagram of a system including a device with broadcast receiver and local wireless interface according to an example embodiment of the present invention. The system 100 may include a device 101 that may include a broadcast receiver 102, a local wireless interface 103, and a controller 104, all interconnected. The controller 104 may control the broadcast receiver 102 and the local wireless interface 103. The device 101 may receive broadcast signals or data from any one or more of a variety of various broadcasting systems 105-109. For example, the device 101 may contain one or more broadcast receivers 102 that may receive audio signals from an audio broadcasting system 105, radio signals from a radio broadcasting system 106, television signals from a television broadcasting system 107, satellite signals from a satellite broadcasting system 108, video signals from a video broadcasting system 109, a combination of some of these, etc. The broadcast receiver 102 may have the capacity to receive one type of broadcasting signal or may have the capacity to receive multiple types of broadcasting signals (e.g., radio, television, satellite). The broadcast receiver 102 may include an antenna 130 for receiving broadcast data. The broadcast receiver may be an audio broadcast receiver, a video broadcast receiver, an analog broadcast receiver, a digital broadcast receiver, or a combination thereof. The broadcast signals or data may be audio data, video data, analog data, digital data, or any combination thereof. Further, the device 101 may contain multiple broadcast receivers 102 each capable of receiving a different type of broadcast signal. The device 101 may be contained in a single IC chip, multiple IC chips, discrete logic and/or may contain software to help implement the broadcast receiver and local wireless interface.

Further, the device 101, after receiving broadcast data or signals from one or more broadcast systems, may transmit these broadcast signals via one or more local wireless interface 103 to one or more wireless devices 115-124. The local wireless interface 103 may be any type of wireless interface and has the capability of transferring received broadcast data or signals to wireless device types such as, for example, IEEE 802.11 (WiFi) devices 111, Bluetooth devices 112, Infrared Data Association (IRDA) devices 113, home radio frequency (HomeRF) devices (114), or other wireless interface type devices 110. In this regard, the local wireless interface 103 may be a WilFi interface, a Bluetooth interface, an IRDA interface, a HomeRF interface, or a combination thereof. Further, the wireless devices 115-124, may be any type of wireless device such as, for example, a speaker 115, a display 116, a wireless or wired phone 117, a personal digital assistance (PDA) 118, an earpiece or earphones 119, a computer 120, an electronic game 121, an audio player 122, a recording device 123, a video player 124, etc. Although not shown, the wireless interface 103 may include one or more appropriate antenna or other transmission mechanisms for transmitting the broadcast data or signals to the one or more wireless devices 115-124.

Therefore, a device 101 according to embodiments of the present invention may receive broadcast data or signals via a broadcast receiver 102 from one or more broadcasting systems 105-109 and transfer the received broadcast signals via one or more local wireless interface 103 to one or more wireless devices 115-124.

A device according to embodiments of the present invention may include a broadcast receiver and a local wireless interface and may be portable or may exist in a non-portable structure. For example, a device according to the present invention may reside in an earpiece or earphone, may reside in a portable device that can be placed in a pocket, attached to a person's body (e.g., mobile phone), held on a necklace around a person's neck, or may be imbedded in a structure such as, for example, a car, an airplane, a boat, a building, an electronic game, a portable phone, any electronic device, etc.

Further, a device according to embodiments of the present invention may have controls on the device 101 or the device may be controlled from a remote control device or other device in a wired or wireless manner. The device 101 may be controlled at the device 101 or may be controlled by one or more of the wireless devices 115-124. One or more of the wireless devices 115-124 may transmit control signals to the device 101 for controlling the operation of the device 101. For example, one or more of the wireless devices 115-124 may transmit control signals to the device 101 for controlling operations such as the powering on/off of the device 101, a sound volume of the device 101, a channel of the device 101, or the transmitting of at least some of the broadcast data to one or more of the wireless devices 115-124.

In addition, a device according to embodiments of the present invention may receive broadcast data that may contain information on multiple channels where the multiple channels of broadcast data are transmitted to one or more wireless devices and where the broadcast data may be decoded or tuned at the wireless devices to receive data on a desired channel. For example, a device according to embodiments of the present invention may receive radio or television broadcast signals on multiple channels and transmit the broadcast signals to one or more wireless devices where each wireless device may select and tune to a desired one radio or television channel of the multiple channels.

Moreover, although not shown, a device according to embodiments of the present invention may include a display where status associated with various functions of the device may be displayed or accessed. For example, a battery condition of the device may be monitored and an indication or warning displayed or transmitted indicating when the remaining battery capacity has fallen below a certain level. Other types of status may include, for example, transmission channel, transmission quality, errors, etc. Further, the status may be monitored remotely by one or more wireless devices via the local wireless interface. In addition, although not shown, a device according to embodiments of the present invention may include memory allowing for various types of information to be stored at the device. For example, a user of the device may decide to store favorite channels, or other user data. This information may be stored directly into the device or transmitted from another wireless device via the local wireless interface to the device and stored.

Figure 2:
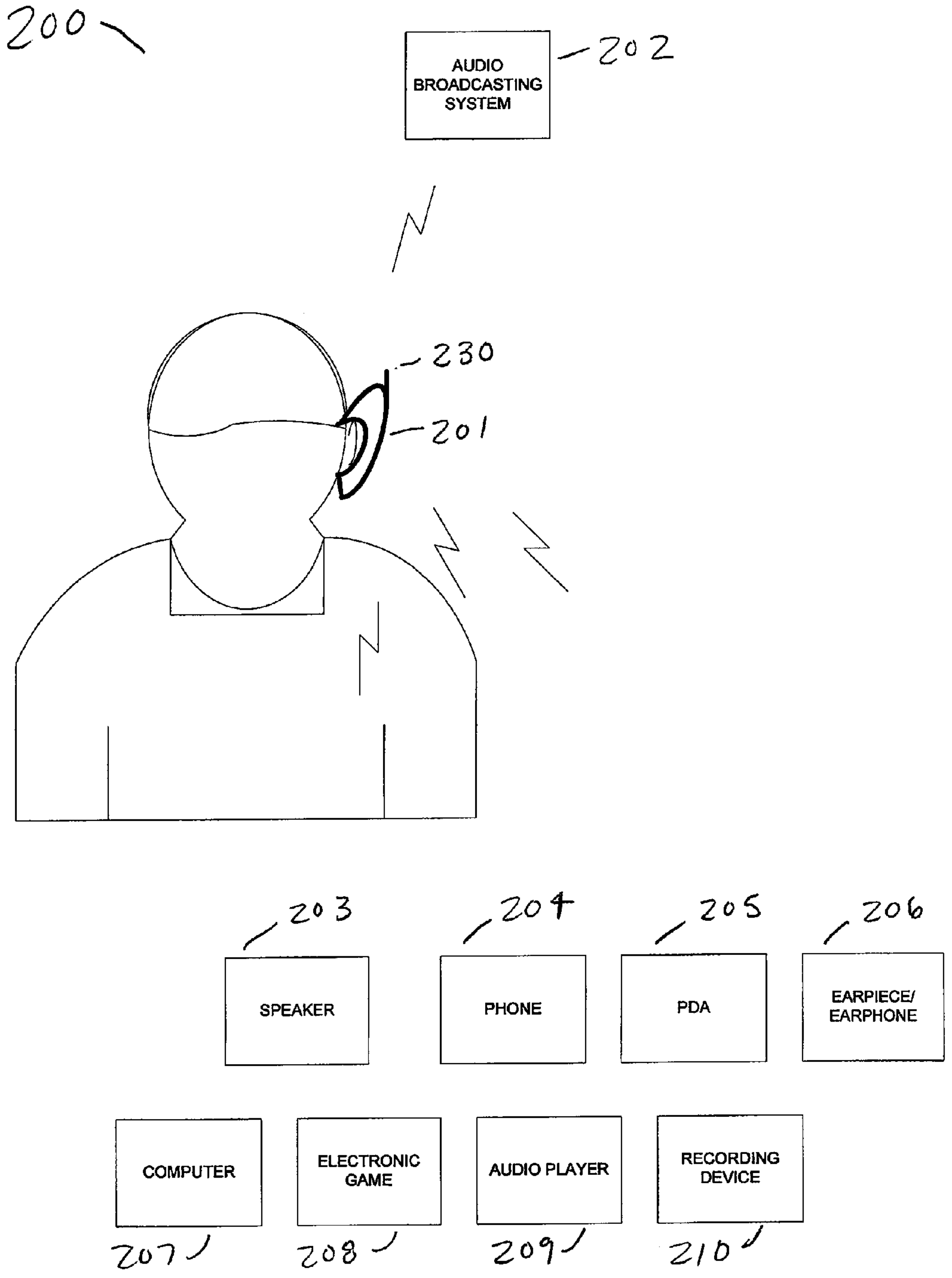
FIG. 2 is a diagram of an audio system with a portable device with broadcast receiver and local wireless interface according to an example embodiment of the present invention.

FIG. 2 shows a diagram of an audio system with a portable device with broadcast receiver and local wireless interface according to an example embodiment of the present invention. The system 200 may include a device 201 that is portable and in this example embodiment, is an earpiece that fits around a person's ear. The device 201 may include a broadcast receiver that may receive audio signals from an audio broadcasting system 202 and transmit these audio signals via a local wireless interface on the device 201 to one or more wireless devices 203-210. The device 201 may include an antenna 230 for receiving and/or transmitting broadcast data such as the audio signals. The device 201 may also include a speaker allowing the person to listen to the audio signals. The audio signals may be transmitted from the device 201 to any type of wireless audio device such as, for example, a speaker 203, a phone 204, a PDA 205, an earpiece or earphone 206, a computer 207, an electronic game 208, an audio player 209, a recording device 210, etc. Further, operations of the device 201 may be controlled at the device 201 or may be controlled by one or more of the wireless devices 203-210.

Figure 3:
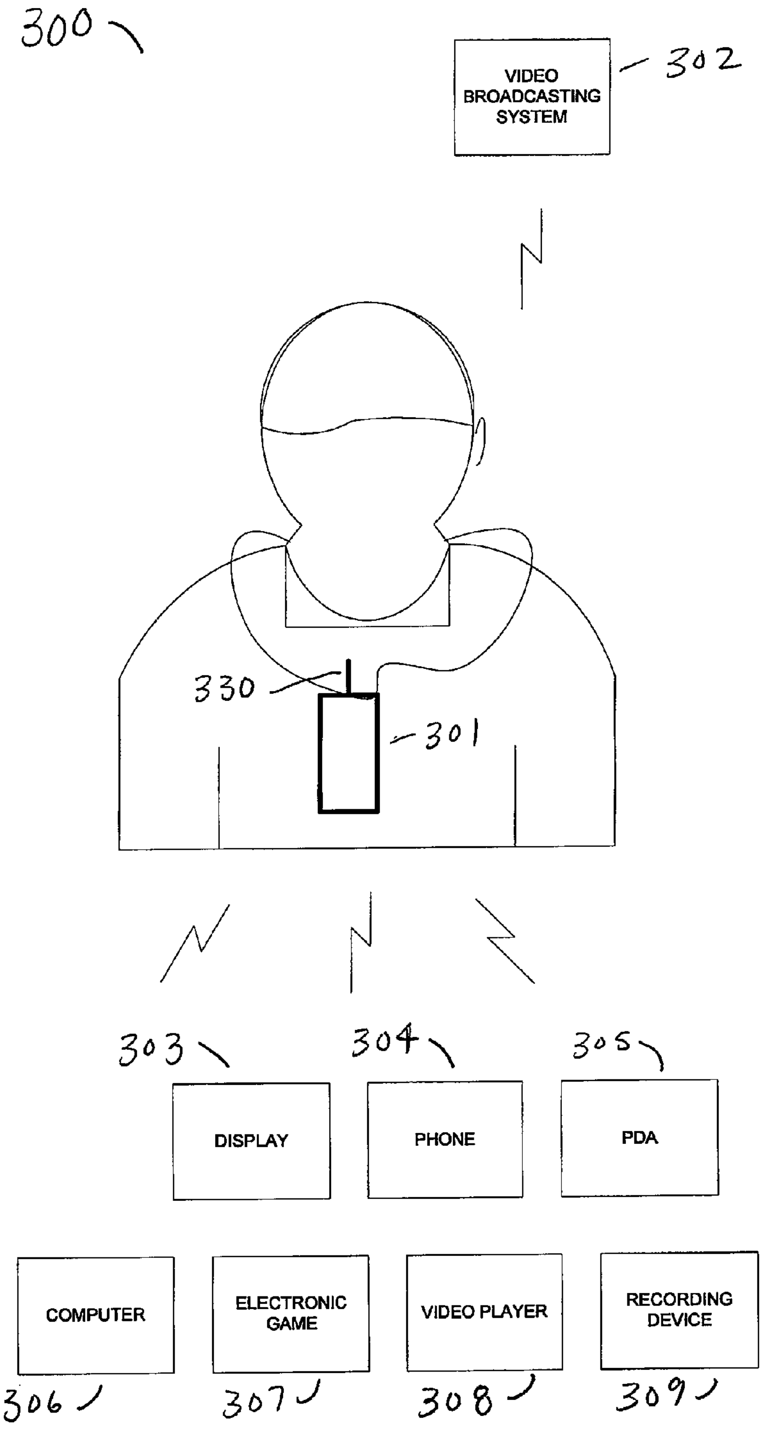
FIG. 3 is a diagram of a video system with a portable device with broadcast receiver and local wireless interface according to an example embodiment of the present invention.

FIG. 3 shows a diagram of a video system with a portable device with broadcast receiver and local wireless interface according to an example embodiment of the present invention. In the system 300, a device 301 may include a broadcast receiver that receives video signals from a video broadcasting system 302 and transmits these video signals via a local wireless interface on the device 301 to one or more wireless devices 303-309. The device 301 may include an antenna 330 for receiving and/or transmitting broadcast data such as the video signals. The device 301 may also include a display allowing a person to view the video signals. The wireless devices may include any type of wireless device capable of receiving video signals such as, for example, a display 303, a phone 304, a PDA 305, a computer 306, an electronic game 307, a video player 308, a recording device 309, etc. Moreover, operations of the device 301 may be controlled at the device 301 or may be controlled by one or more of the wireless devices 303-309.

Figure 4:
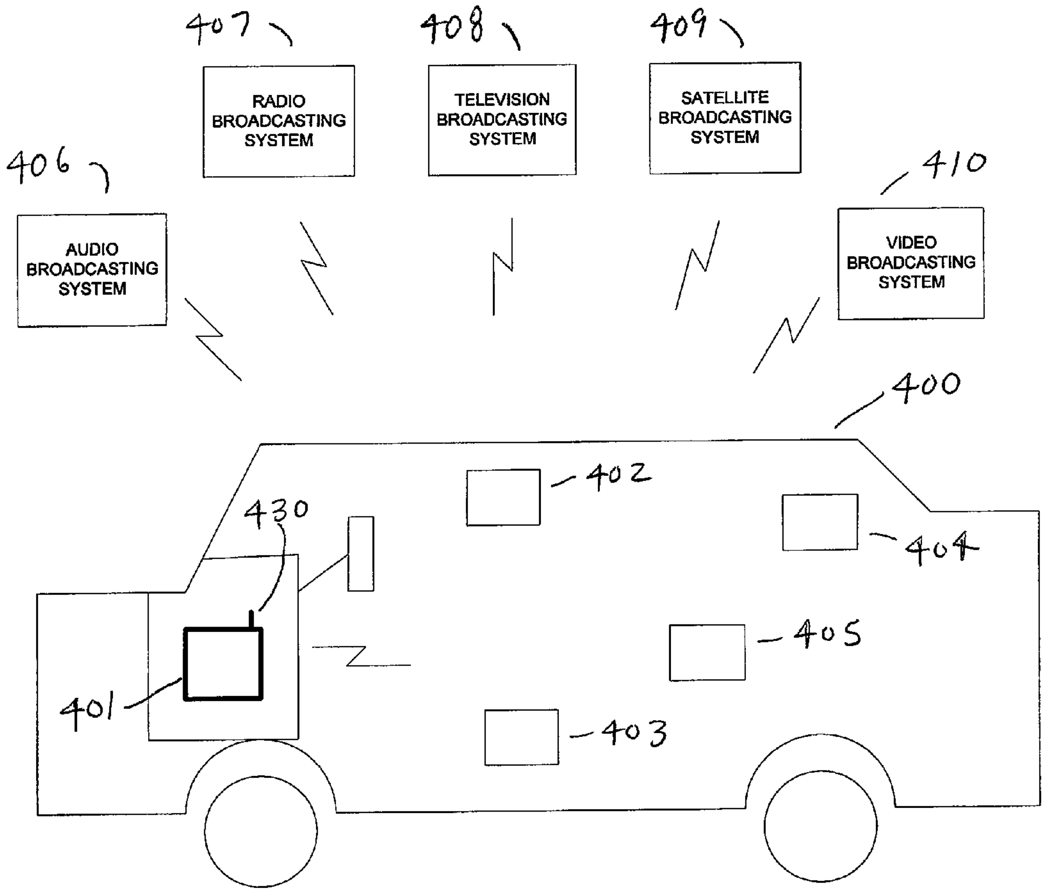
FIG. 4 is a diagram of a device with broadcast receiver and local wireless interface in a structure according to an example embodiment of the present invention.

FIG. 4 shows a diagram of a device with broadcast receiver and local wireless interface in a structure according to an example embodiment of the present invention. The structure 400 in this example embodiment is a vehicle where the vehicle may have a device 401 installed, for example, in the dash. The device 401 may include a broadcast receiver for receiving broadcast data or signals from a broadcasting system (e.g., an audio broadcasting system 406, a radio broadcasting system 407, television signals from a television broadcasting system 408, satellite signals from a satellite broadcasting system 409, video signals from a video broadcasting system 410, etc.) and transmitting the broadcast signals via a local wireless interface on the device 401 to one or more wireless devices 402-405. The device 401 may include an antenna 430 for receiving and/or transmitting broadcast data. For example, the vehicle 400 may receive broadcast radio or television signals via the broadcast receiver of the device 401. One or more wireless devices 402-405 in the vehicle 400 may receive these broadcast signals from the local wireless interface on the device 401. The wireless devices 402-405 may all receive the same broadcast signal channel or each wireless device 402-405 may include individual tuners allowing each wireless device 402-405 to tune to a desired channel to receive a specific broadcast signal.

Figure 5:
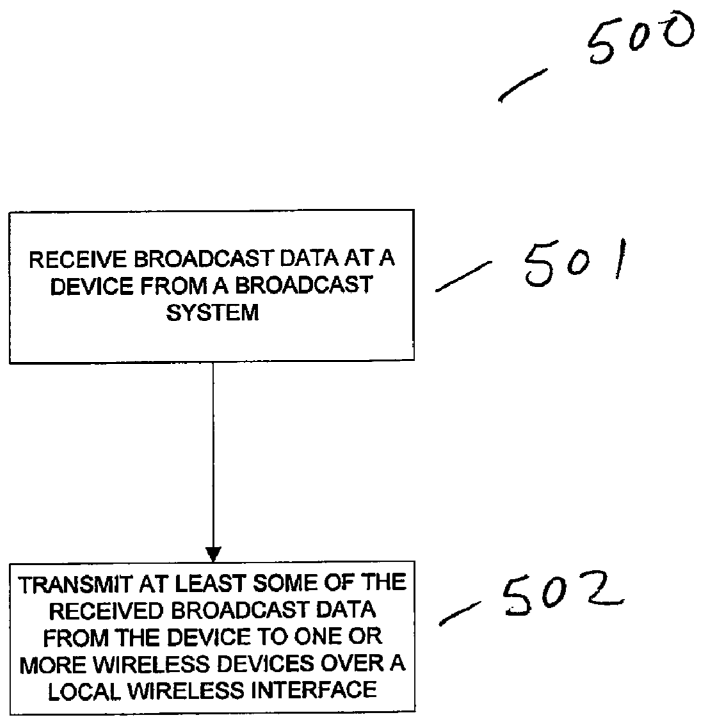
FIG. 5 is a flowchart of a process for receiving and transmitting broadcast data according to an example embodiment of the present invention.

FIG. 5 shows a flowchart of a process for receiving and transmitting broadcast data according to an example embodiment of the present invention. In the process 500, in block 501, broadcast data may be received at a device from a broadcast system. In block 502, at least some of the received broadcast data may be transmitted from the device to one or more wireless devices over a local wireless interface of the device.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A mobile wireless communications device comprising:

a broadcast receiver configured for receiving broadcast data at the mobile wireless communications device allowing for the broadcast data to be received when the mobile wireless communications device is roaming from location to location; and a local wireless interface configured for:

communicating with at least one portable, near-field wireless device, the portable, near-field wireless device being portable and located within a near-field distance of the mobile wireless communications device while the mobile wireless communications device is roaming from location to location; and transmitting at least some of the broadcast data to the at least one portable, near-field wireless device while the mobile wireless communications device is roaming from location to location.

2. The mobile wireless communications device according to claim 1, wherein the broadcast receiver comprises one of an audio broadcast receiver and a video broadcast receiver, the broadcast data comprising at least one of audio data and video data.

3. The mobile wireless communications device according to claim 2, wherein one of the audio broadcast receiver and the video broadcast receiver comprises at least one of an analog broadcast receiver and a digital broadcast receiver.

4. The mobile wireless communications device according to claim 1, wherein the local wireless interface comprises at least one of a Bluetooth interface, an IEEE 802.11 (WiFi) interface, an IrDA interface, or a home radio frequency (HomeRF) interface.

5. The mobile wireless communications device according to claim 1, wherein the at least one portable, near-field wireless device comprises at least one of a Bluetooth device, a WiFi device, an IrDA device, or a HomeRF device.

6. The mobile wireless communications device according to claim 1, wherein the at least one portable, near-field wireless device comprises at least one of a speaker, a display, a phone, a personal computer, a personal digital assistant (PDA), an electronic game device, an earpiece, a radio, or a recording device.

7. The mobile wireless communications device according to claim 1, wherein the device is contained in at least one of a motor vehicle, a building, a boat, an earpiece, a phone, or an electronic device.

8. The mobile wireless communications device according to claim 1, wherein the device is controlled by the at least one portable, near-field wireless device.

9. The mobile wireless communications device according to claim 8 wherein the at least one portable, near-field wireless device transmits control signals to the device for controlling the operation of the mobile wireless communications device.

10. The mobile wireless communications device according to claim 9 wherein the at least one portable, near-field wireless device transmitting control signals to the mobile wireless communications device for controlling the operation of the mobile wireless communications device comprises at least one of Bluetooth, WiFi, IrDA, and HomeRF.

11. The mobile wireless communications device according to claim 9 wherein the at least one portable, near-field wireless device controls at least one of on/off, volume, and channel of the mobile wireless communications device.

12. The mobile wireless communications device according to claim 8 wherein the at least one portable, near-field wireless device controls the transmitting at least some of the broadcast data to the at least one portable, near-field wireless device.

13. A method for transferring broadcast data comprising:

receiving broadcast data by a broadcast receiver at a mobile wireless communications device allowing for the broadcast data to be received when the mobile wireless communications device is roaming from location to location; and transmitting at least some of the broadcast data to at least one portable, near-field wireless device over a local wireless interface of the mobile wireless communications device while the mobile wireless communications device is roaming from location to location, the portable, near-field wireless device being portable and located within a near-field distance of the mobile wireless communications device while the mobile wireless communications device is roaming from location to location.

14. The method according to claim 13, further comprising receiving broadcast data comprising at least one of audio data or video data.

15. The method according to claim 13, further comprising receiving broadcast data comprising at least one of a radio broadcast, a television broadcast, or a satellite broadcast.

16. The method according to claim 13, further comprising transmitting at least some of the broadcast data to a Bluetooth device, a WiFi device, an IrDA device, or a HomeRF device.

17. The method according to claim 13, further comprising transmitting at least some of the broadcast data to at least one of a speaker, a display, a phone, a personal computer, a personal digital assistant (PDA), an electronic game device, an earpiece, a radio, or a recording device.

18. The method according to claim 13 further comprising controlling the mobile wireless communications device at least one of by the mobile wireless communications device or by the at least one portable, near-field wireless device.

19. The method according to claim 18 further comprising transmitting control signals from the at least one portable, near-field wireless device to the mobile wireless communications device for controlling the operation of the mobile wireless communications device.

20. The method according to claim 19 further comprising transmitting control signals from the at least one portable, near-field wireless device to the mobile wireless communications device using at least one of Bluetooth, WiFi, IrDA, and HomeRF.

21. The method according to claim 19 further comprising transmitting control signals from the at least one portable, near-field wireless device to control at least one of on/off, volume, and channel of the mobile wireless communications device.

22. The method according to claim 19 further comprising transmitting control signals from the at least one portable, near-field wireless device to control the transmitting at least some of the broadcast data to from the mobile wireless communications device to the at least one portable, near-field wireless device.

23. An apparatus comprising a storage medium with instructions stored therein, the instructions when executed causing a processing device to perform:

receiving broadcast data by a broadcast receiver at a mobile wireless communications device allowing for the broadcast data to be received when the mobile wireless communications device is roaming from location to location; and transmitting at least some of the broadcast data to at least one portable near-field wireless device over a local wireless interface of the mobile wireless communications device while the mobile wireless communications device is roaming from location to location, the portable, near-field wireless device being portable and located within a near-field distance of the mobile wireless communications device while the mobile wireless communications device is roaming from location to location.

24. The apparatus according to claim 23, further performing receiving broadcast data comprising at least one of audio data or video data.

25. The apparatus according to claim 23, further performing transmitting at least some of the broadcast data to a Bluetooth device, a WiFi device, an IrDA device, or a HomeRF device.

* * * * *